United States Patent
Kadatch et al.

(10) Patent No.: US 7,363,298 B2
(45) Date of Patent: Apr. 22, 2008

(54) OPTIMIZED CACHE EFFICIENCY BEHAVIOR

(75) Inventors: Andrew Kadatch, Redmond, WA (US); James Walsh, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/095,473

(22) Filed: Apr. 1, 2005

(65) Prior Publication Data
US 2006/0224578 A1    Oct. 5, 2006

(51) Int. Cl.
*G06F 17/30* (2006.01)
(52) U.S. Cl. .............................. 707/3; 707/4; 707/100; 707/101
(58) Field of Classification Search ...................... None
See application file for complete search history.

(56) References Cited

U.S. PATENT DOCUMENTS

| | | | |
|---|---|---|---|
| 2004/0133567 A1* | 7/2004 | Witkowski et al. | 707/3 |
| 2004/0230566 A1* | 11/2004 | Balijepalli et al. | 707/3 |
| 2005/0177561 A1* | 8/2005 | Ramanathan et al. | 707/3 |

* cited by examiner

*Primary Examiner*—Don Wong
*Assistant Examiner*—Shyue-Jiunn Hwa
(74) *Attorney, Agent, or Firm*—Shook, Hardy & Bacon, L.L.P.

(57) ABSTRACT

A method is provided for storing and providing responses to keyword search queries and other queries. One of a plurality of memory devices for storing a query answer is selected based on a hash value of the query. The hash value is used to select a permutation for ordering the memory devices. One or more memory devices for storing the query answer are selected based on the ordering. Additionally, stored query answers are updated based on comparing a storage time to one or more threshold values.

16 Claims, 4 Drawing Sheets

OPTIMIZED CACHE EFFICIENCY BEHAVIOR

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This invention relates to a method for storing and providing responses to queries for electronically stored information.

BACKGROUND OF THE INVENTION

Search engines are a commonly used tool for identifying desired documents from large electronic document collections, including the world-wide internet and internal corporate networks. Documents are often identified by providing the search engine with a search query composed of one or more keywords. The search engine then returns documents matching the search query keywords.

One of the problems in searching a large document collection, such as the billions of documents accessible via the world-wide Internet, is responding to a search query in a reasonable amount of time. Preferably, a search engine can provide an answer to a search query in seconds or less. One technique for improving response time is to store the results or query answers for frequently used search queries in a memory cache. However, responding to a search query with a stored query answer may provide a user with "stale" results that do not include the most relevant documents. A conventional solution is to discard all stored query answers when new information becomes available. This avoids having stale results, but can cause unacceptably long response times as once the stored query answers are discarded, every unique query received will require formation of a new query answer.

Due to the large number of potential search queries, storing search query answers also poses significant problems. The large amount of data makes it difficult to store all of the search query answers on a single machine. Additionally, even if the results could be stored on a single machine, the number of search queries submitted could overwhelm the machines processing capacity, resulting in slow response times. One solution is to split the storage across many machines or memory devices. However, using many machines to store the query answers increases the likelihood that a query answer will become unavailable due to a machine failure. Additionally, response times can still be slow if the query answers are not distributed evenly among the machines.

What is needed is a fault-tolerant method for providing a query answer in response to a query. The method should provide current information in response to a query while maintaining fast response times. The method should also allow for storage of query answers on a plurality of machines while balancing the number of results stored on each machine. The method should also be adaptable to changes in the number of machines currently available for balancing.

SUMMARY OF THE INVENTION

In an embodiment, the invention provides a method for storing and providing query answers in response to a query, such as a search query. First, a query is received that corresponds to a query answer stored in a cache. The query is used to calculate a hash value. A permutation of how to order the members of a group is selected based on the hash value, with the members of the group corresponding to available and unavailable memory devices for storing the query answer. A memory device having the stored query answer is then identified based on the order of the members in the permutation. The stored query answer is then located in the identified memory area and provided in response to the query.

In another embodiment, the invention includes a method for providing a query answer in response to a query. First, a query is received that corresponds to a stored query answer. The storage time for the query answer is then determined. If the storage time is greater than a threshold time value, the stored query answer is provided in response to the query. An updated query answer is then obtained based on the query, and the stored query answer is replaced with the updated query answer.

DETAILED DESCRIPTION OF THE EMBODIMENTS

I. Overview

In various embodiments, this invention provides methods for providing electronic documents or other information from a large data collection in response to a query. Searching a large data collection for the appropriate documents or information to respond to a query can be a time-consuming process. To reduce the response time, the query answer corresponding to a given query can be stored in a data cache, such as a memory cache or other memory device associated with a computer. If the same query is received again, the stored query answer can be provided.

In an embodiment, the number of stored query answers can become too large to be stored efficiently in a single memory device and/or on a single machine. In such an embodiment, the query answers can be stored in a fault tolerant manner in multiple memory devices, with the memory devices possibly being distributed over multiple machines. To determine the memory device for storing and retrieving a query answer, the memory devices are each assigned a designation. Various permutations corresponding to different ways of sequentially ordering the designated memory devices are identified. A hash value is then calculated based on a query for which a query answer is desired. The hash value is used to select one of the permutations. A memory device where the query answer is stored is determined based on the selected permutation. Preferably, the first memory device in the permutation contains the query answer, while the second memory device in the permutation contains a backup copy of the query answer. By storing and retrieving the query answer from a memory device selected according to the invention, the query answers for various queries can be evenly distributed among the memory devices. Additionally, if one of the memory devices becomes unavailable, the query answers formerly belonging to the unavailable memory device can be distributed evenly among the remaining memory devices.

In another embodiment, the invention also provides a method for providing a query answer with an improved response time while reducing the likelihood that the provided query answer contains old or incorrect information. When a query is received that corresponds to a query answer stored in a memory device, the length of the time the query answer has been stored is determined. The length of storage time is then used to determine how to respond to the query, rather than automatically returning the stored query answer or automatically generating an updated query answer. If the storage time for the query answer is small, the query answer is returned. If the storage time is somewhat longer, the stored query answer can be returned and then a new query answer can be generated. This allows the current query to be responded to quickly while generating an updated query answer for the next time the same query is received. If storage time is still longer and processor time is available, the stored query answer can be discarded. An updated query answer is then generated and returned in response to the query.

In an embodiment, the methods of this invention can be used to improve the response time and freshness of results for responses to search queries for searches on large document collections, such as the Internet. In another embodiment, the methods of the invention can be used for retrieval of information for a large database of information, such as responding to a query for the seating chart of available seats on an airplane flight.

II. General Operating Environment

Figure 1:
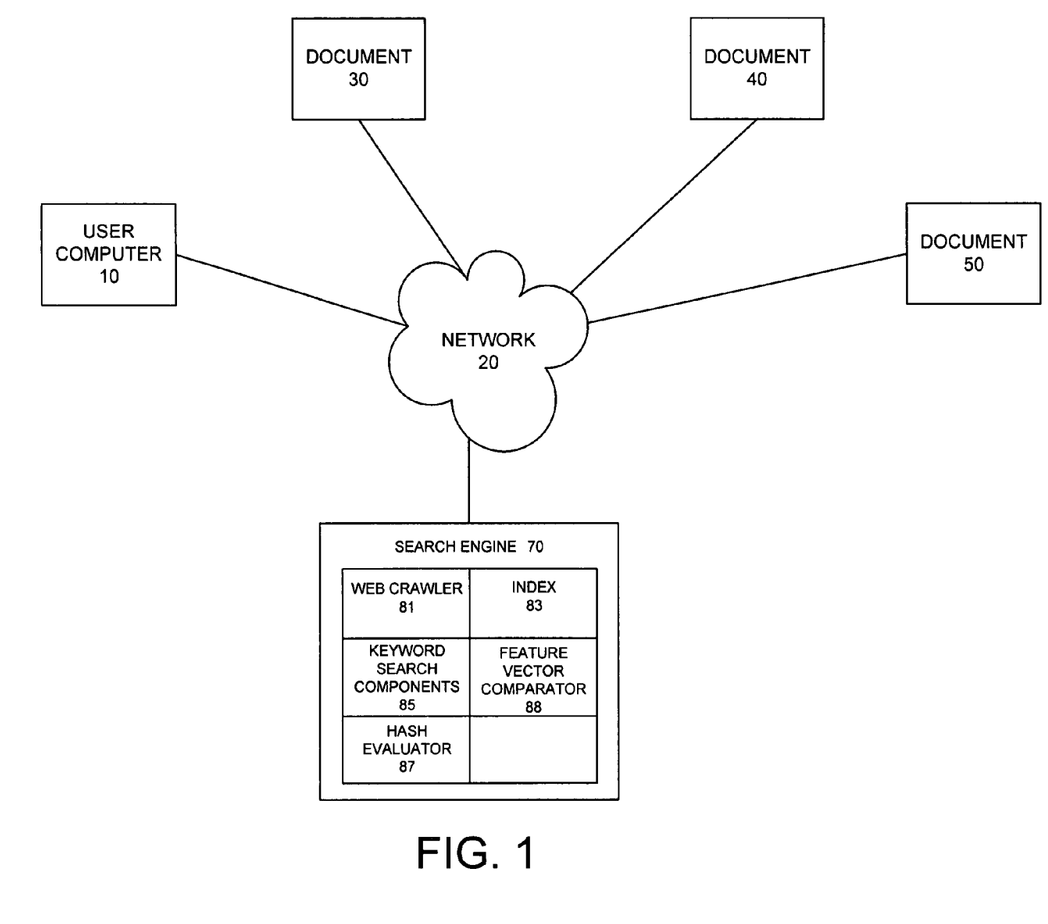
FIG. 1 is a block diagram illustrating an overview of a system in accordance with an embodiment of the invention.

FIG. 1 illustrates a system for providing query answers in response to a query. In the embodiment shown in FIG. 1, the query corresponds to a search query requesting matching documents from a large document collection such as the Internet. In this embodiment, a user computer 10 may be connected over a network 20, such as the Internet, with a search engine 70. The search engine 70 may access multiple web sites 30, 40, and 50 over the network 20. This limited number of web sites is shown for exemplary purposes only. In actual applications the search engine 70 may access large numbers of web sites over the network 20.

The search engine 70 may include a web crawler 81 for traversing the web sites 30, 40, and 50 and an index 83 for indexing the traversed web sites. The search engine 70 may also include a keyword search component 85 for searching the index 83 for results in response to a search query from the user computer 10. The search engine 70 may also include a hash evaluator 87. Hash evaluator 87 can generate a hash value based on a search query and then identify the appropriate machine and/or memory device for storage and/or retrieval of the query answer.

Figure 2:
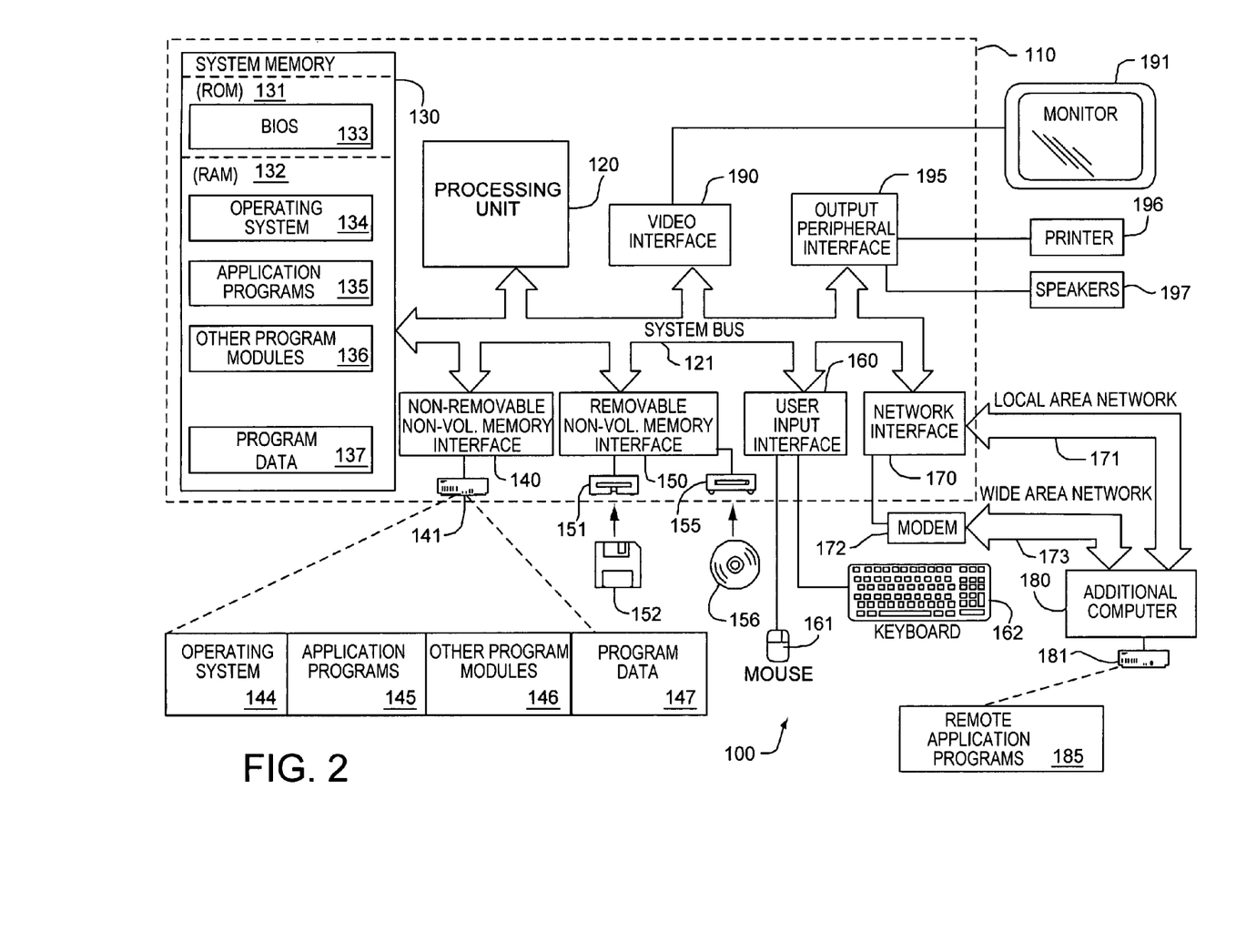
FIG. 2 is block diagram illustrating a computerized environment in which embodiments of the invention may be implemented.

FIG. 2 illustrates an example of a suitable computing system environment 100 for implementing context based searching according to the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/nonremovable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more other computers, such as additional computer 180. Although only one additional computer 180 is shown, a local area network (LAN) 171 or wide area network (WAN) 173 may be used to connect multiple additional computers 180 to computer 110. Additional computer 180 may be a personal computer, and typically includes many or all of the elements described above relative to the computer 110, although only a memory storage device 181 has been illustrated in FIG. 2. In a networking environment, computer 110 and additional computers 180 can be closely interconnected to allowing sharing of resources and/or parallel operation. Alternatively, additional computer 180 may be a remote computer with only limited access to resources available on computer 110.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. Queries and Query Answers

In an embodiment, a query is a search query, such as a keyword search query provided by a user to search for documents in a large document collection such as the Internet. In such an embodiment, the query is composed of one or more keywords, where a keyword is any string of characters that are searchable using a search engine. In this embodiment, the query answer is a list of documents (or possibly the documents themselves) identified by a search engine based on a corresponding search query. The query answer can be a sorted or unsorted list of documents. The query answer can also include additional information about the documents, such as various feature scores corresponding to each matching document identified by the search engine based on the query.

In another embodiment, a query can be a request for data from a data collection. For example, the query can be a request for a list of currently available products from an e-commerce website. The query can be of any format, such as a collection of keywords, that allows a query answer to be uniquely identified. In this embodiment, the query answer is the data corresponding to the query, such as a list of the available products and/or a link to a more detailed description of each product and/or other information.

In various embodiments, a data retrieval engine uses a query to identify a corresponding query answer. For example, the data retrieval engine can be a keyword search engine for identifying documents that match a search query.

IV. Assigning Queries to Machines

In an embodiment where query answers are stored on a large number of machines and/or memory devices, the query answers should be distributed evenly between the various machines (or memory devices). In such an embodiment, the machine or memory device for storing a query answer can be selected by first selecting one permutation for sequentially ordering the machines or memory devices from all possible permutations. The first machine listed in the selected permutation is then selected as the primary machine for storing the query answer. In embodiments where backup machines are used to store additional copies of the query answer, the second machine listed in the permutation can be selected as the first backup machine. More generally, any number of backup machines could be assigned for storage of the query answer based on the order of machines in the selected permutation.

As an example, 5 machines are members of the group of machines available for storing query answers. The member machines can be assigned names A, B, C, D, and E. There are 5! (or 120) different permutations for sequentially ordering these 5 machines. In each of these permutations, the ordering of the 5 machines is different. In this example, a permutation corresponding to the ordering B-E-D-C-A is selected. Based on selection of this permutation, machine B would be used as a primary storage machine. If one or more backup machines is desired, machine E would be the first backup, machine D would be the second backup, and so on. In another embodiment, the members can be designated in any convenient way, such as by assigning a number corresponding to each member.

In another embodiment, the number of available permutations can be expanded by having more members in the sequence than machines for storing query answers. These additional members can be thought of as machines that either do not exist or that are otherwise unavailable for use. For example, in an embodiment where 500 machines are available for storing query answers, the list of permutations can be based on 2000 members. In this example, there are 2000! possible permutations to select from. Once a permutation is selected, the members of the permutation are checked sequentially to determine if an element corresponds to an available machine. When an element is found that corresponds to an available machine, that machine is selected as the primary storage machine. In an embodiment where backup machines are used, the process of checking members continues until the next available machine is identified.

Note that members that do not correspond to an available machine are effectively identical. Switching the position of two members that do not correspond to an available machine does not change which machine is assigned as the primary storage machine or a backup machine. As a result, in the above example, there are not 2000! unique permutations. Instead, the number of unique permutations can be mathematically expressed as (2000!)*(500!)/[(2000−500)!].

In an embodiment where the permutations include additional members that do not correspond to machines, available machines can be added or subtracted while maintaining an even distribution of query answers between all available machines. When an additional machine becomes available, the overall number of members does not change. Instead, one of the members is changed to become a member that corresponds to an available machine. Similarly, when a machine becomes unavailable, the member corresponding to that machine can be modified accordingly. For example, if an available machine becomes inoperative for any reason, the member corresponding to the machine can be changed from designating an available machine to designating an unavailable machine. In other words, the member corresponding to the inoperative machine can be removed from the group of members corresponding to available machines. Note that when permutation is selected, the order of the members in the permutation remains the same independent of the number of available machines. The number of permutations also remains the same, as the number of members is not changed.

In still another embodiment, the number of members used for constructing the permutations can be much larger than the number of available machines. In such an embodiment, if N is the number of available machines for storing query answers, the number of members M is selected to be an order of magnitude larger than N. This leads to creation of M! permutations, with M!*N!/(M−N)! permutations of unique sequential orders for the N available machines.

In an embodiment, the number of machines N can be 10, 25, 50, 100, 200, 500, or any other convenient number of machines. In another embodiment, N represents a number of available memory devices rather than available machines. In an embodiment, the number of members M can be 50, 100, 500, 1000, 5000, 10,000, or any other convenient number of members.

V. Creating a Hash Value Based on a Query

In various embodiments, a hash value based on a query is used to select the permutation for determining a machine for storing or retrieving a query answer. In an embodiment, any convenient hash function can be used. One common hash function for converting a query to a hash value is based on using the ASCII values for the characters in the query. The ASCII values for each character in the query are summed to generate a numeric value for the query. This numeric sum can then be further manipulated, such as by finding a modulo of the sum (i.e. dividing by a number to obtain the remainder).

In another embodiment, the number of members M can be 100 or greater, or 500 or greater, or 1000 or greater. This results in a large number of possible permutations, requiring a permutation to be selected from a large number of possible permutations. In such an embodiment, a hash function can be used that is well-suited to selection of large numbers. A suitable hash function can be a partial or incremental hash function. A partial hash function is a function $F(k,Q)$ that can return portions of a hashed value based on a query Q. Each portion of the hashed value corresponds to bits 64\*k through (64\*k)+1 of the hashed value. In another embodiment, the partial hash function can be a 32-bit or 128-bit hash function.

In an alternative embodiment, still another type of hash function can be used that provides numbers that still more closely approximate a random sequence relative to a full or partial hash function. Additionally, the hash functions of this embodiment are more difficult to reverse-engineer, making such functions desirable for secure applications.

In an embodiment, a hash function can be a function of a query or query string S[ ] which has N characters, a table or array of random values R[ ] which contains $2^L$ numbers that each contain $2^W$ bits, and a Seed value. (Note that the brackets for S[ ] and R[ ] are used to designate that S and R are arrays.) During computation of the hash value, the hash function uses a bitwise "exclusive or" operation to combine the bits from a character in the query string S with the current hash value. A modulus relative to the total number of values in random array R is performed, and the value is once again subjected to an "exclusive or" operation. This is repeated for each character in the query string S. In terms of psuedo-code, the hash function F (S[ ], N, R[ ], Seed) can be written as:

```
Set H = Seed modulo 2^W;
Set i = 0;
While (i < N) Repeat
    Set H = R[(S[i] XOR H) modulo 2^L] XOR H;
    Set i = i + 1
EndWhile;
    Return (H);
```

The above algorithm provides a way to reliably generate a hash value based on a query that should evenly distribute query answers over all available machines. In other words, the hash values generated by the above algorithm should appear to be randomly distributed.

In still another embodiment, other hash function algorithms can be used. For example, in the above algorithm, the next value of H can be computed instead by the following equation:

Set $H=R[(S[i] XOR\ H) modulo\ 2^L] XOR$ ROTATE $(H, L, W)$;

where ROTATE (H, L, W) rotates W-bit value H by L bits to the left or to the right. Preferably, L and W do not have non-trivial common divisors. In such an embodiment, the least significant L bits of the previous value of H are moved to another position and will not be used for computation of the next index selected from R[ ]. This further reduces the chances that the results of the hash function will demonstrate biasing in the generation of values.

In still other embodiments, further alterations of the hash function computation are possible. In general, the hash function will be suitable for selecting permutations so long as the next value of H created on each step is obtained by mixing (preferably with the use of the next input byte) the old value of H with a value from randomized table R[ ], the value from a randomized table R[ ] being indexed by a mixed value of the next input byte and old value of H as follows:

$$H=f(R[g(H,S[i])\text{modulo } 2^L], H, S[i])$$

where f(x,y,z) and g(a,b) are implementation defined functions, and S[ ] and L represent a query and a number of bits, respectively, as described above. For example, in an embodiment, f(x,y,z) and g(a,b) can be defined as $$f_1(x,y,z)=x \text{ XOR } y$$

$$g_1(a,b)=a \text{ XOR } b$$

In another embodiment, f(x,y,z) and g(a,b) can be defined as $$f_2(x,y,z)=x \text{ XOR ROTATE}(y, L, W)$$

$$g_2(a,b)=a \text{ XOR } b$$

Depending on specific requirements (e.g. complexity of reverse engineering, speed of computation, and so forth), the above hash function can use any of a variety of ways for determining a "mixed" value—from trivial changes, such as replacing the bitwise XOR operation with arithmetic addition modulo $2^W$; to more sophisticated ones, such as, performing a data-dependent rotation of H by (S[i] modulo L) bits instead of a cyclic rotation of H by a fixed amount of bits L.

VI. Calculating a Permutation

In addition to selecting a permutation, the order of members in the permutation must be determined. In an embodiment where the number of members is relatively small, this can be done by explicitly calculating each possible permutation. A number can then be assigned to each permutation and a hash function can be used to generate values corresponding to the permutation numbers. Mathematically, for a hash function F(Q), the permutation number J is selected by $$J=F(Q) \text{ modulo } M!$$

In another embodiment, the order of members in a permutation can be calculated as needed. This can be accomplished using an algorithm such as the Transposition Shuffling Algorithm, as discussed in D. E. Knuth, "The Art of Computer Programming," vol. 2. In this embodiment, when permutation number K is selected, the position of all members of permutation $P_J$[ ] are not calculated. Instead, the order is only determined for the first few members of the permutation $P_J$[ ]. In an embodiment, the ordering for enough members is calculated to determine the first member corresponding to a machine, M(Q,0), which corresponds to the machine which will be the primary storage for the query answer corresponding to a query Q. In another embodiment, the calculation of ordering for members is continued until a member M(Q,1) corresponding to another available machine is found. The member M(Q,1) is then assigned as the first backup for storage of the query answer corresponding to a query Q. In still other embodiments, the ordering of additional members corresponding to available machines can be calculated to determine additional backup storage machines.

To determine the $J^{th}$ permutation $P_J$[ ], an base permutation $P_1$[ ] must be provided. The $J^{th}$ permutation for the members can then be calculated using the following psuedo-code:

```
For k = 0 to M − 1, Set T[k] = P_1[k] ;
Set j = J;
Set i = 0;
Repeat
    Swap T[i] and T[i + (j modulo (M−i))];
    Set j = j / (M − i)
    Set i = i + 1;
While (i < M − 1);
For k = 0 to M − 1, Set P_J[k] = T[k]
```

Note that the above calculation can be stopped as soon as enough members corresponding to available machines have been identified.

In still another embodiment, a partial or incremental hash function can be used to select a permutation K without having to explicitly calculate an integer label for the permutation. In this embodiment, the calculation of member ordering in the permutation is intertwined with identification of the permutation K. A suitable algorithm for determining the order of members in a permutation is provided by the following psuedo-code:

```
Set T = P;
Set MaxAvailableValue = 1;
Set H = 0;
Set k = 0;
Set I = 0;
Repeat
    If MaxAvailableValue <= (M−i) Then
        Set H = H + MaxAvailableValue * F (k, Q);
        Set MaxAvailableValue = MaxAvailableValue * 2^B;
        Set k = k + 1;
    EndIf;
    Swap T[i] and T[i + (H modulo (M−i))];
    Set H = H / (M−i);
    Set MaxAvailableValue = MaxAvailableValue / (M−i);
    Set i = i + 1
While (T[i] is 0);
Return (T[i]);
``` where B is the number of bits returned by the hash function F(k,Q). Note that the above algorithm also makes use of Transposition Shuffling to determine the member ordering in the permutation.

VII. Retrieving Stored Query Answers

In addition to providing a method for distributing query answers among multiple machines and/or memory devices, the invention also provides a method for retrieving and updating stored query answers. Although it is typically faster to provide a stored query answer, a stored query answer may not contain the most current information. Thus, it is desirable to balance providing a fast response to a query with providing a query answer that contains the most current information.

In an embodiment, when a query is received for a corresponding query answer, the storage time for the query answer is determined. In an embodiment, the storage time represents the length the time the query answer has been stored in cache since the last update of the query answer. The storage time for the query answer is then compared with one or more time thresholds. If the storage time is less than a threshold $T_1$, the stored query answer is considered to have fresh information and is provided as a response to the query. The threshold $T_1$ can be referred to as a "refresh time." If the storage time is greater than a threshold $T_3$, the stored query answer is not used. Instead, the query is used to generate an updated query answer. The updated query answer is provided as a response to the query and the stored query answer is replaced with the updated query answer. Threshold value $T_3$ can be referred to as a "discard time."

If the query storage time is between $T_1$ and $T_3$, the cached result may or may not be returned. The decision for whether to use a cached result having an intermediate query storage time can be an implementation-dependant decision, as a number of reasonable strategies are available. For example, additional thresholds can be used to provide further balancing between responding quickly and responding with the most current information. In an embodiment, a threshold $T_2$ can have a value between thresholds $T_1$ and $T_3$. If the storage time for a query answer is greater than $T_1$ but less than $T_2$, the stored query answer is provided in response to the query. The query is then used to generate an updated query answer to replace the stored query answer. Although the current query will receive the stored query answer, any future queries will receive the updated query answer. If the storage time is greater than $T_2$, the stored query is not used and an updated query answer is provided. Preferably, threshold $T_2$ is a threshold that can vary according to the current computational load. During a time of high computer usage, $T_2$ could become as high as $T_3$. During a time of lower computer usage, $T_2$ could drop to as low as $T_1$. Allowing $T_2$ to vary provides additional balancing between providing a faster, stored response and a slower, updated response. Threshold value $T_2$ can be referred to as a "variable discard time." In still another embodiment, the threshold values can vary depending on the query.

The values for thresholds $T_1$, $T_2$, and $T_3$ can vary greatly, depending on the type of query and query answer. In an embodiment where a query corresponds to a search query for documents from a large document collection, $T_1$ can be 30 minutes or greater, or 1 hour or greater, or 2 hours or greater. Alternatively, $T_1$ can be 1 hour or less, or 2 hours or less, or 3 hours or less. In another embodiment, $T_1$ can be 5 hours or greater, or 10 hours or greater, or 1 day or greater. Alternatively, $T_2$ can be 10 hours or less, or 1 day or less, or 2 days or less. In various embodiments, $T_3$ can be 4 hours or greater, or 8 hours or greater, or 12 hours or greater, or 1 day or greater, or 2 days or greater, or 1 week or greater. Alternatively, $T_3$ can be 8 hours or less, or 12 hours or less, or 1 day or less, or 2 days or less, or 1 week or less, or 2 weeks or less. In various embodiments, $T_2$ can have any value between $T_1$ and $T_3$, including any of the $T_1$ or $T_3$ values listed above. In another embodiment, the value of $T_2$ varies depending on the current computational load. In such an embodiment, $T_2$ will have the lower of two possible values if the expected time to prepare a query answer is 0.1 seconds or less, or 0.2 seconds or less, or 0.5 seconds or less, or 1 second or less, or 2 seconds or less, or 5 seconds or less, or 10 seconds or less. Alternatively, $T_2$ can have the higher of two possible values if the expected time to prepare a query answer is 0.2 seconds or more, or 0.5 seconds or more, or 1 second or more, or 2 seconds or more, or 5 seconds or more, or 10 seconds or more, or 20 seconds or more. In still another embodiment, $T_2$ can vary linearly between the value of $T_1$ and $T_3$, with the linear variance being directly proportional to a computer loading.

In still another embodiment, a threshold $T_0$ can be used for updating of query answers. If a query answer is provided that has a storage time of less than $T_1$ but greater than $T_0$, the computer loading can be checked. If the computer loading is low enough, an updated query answer can be obtained to replace the stored query answer. Alternatively, the stored query answers can be scanned for storage times greater than $T_0$. This process is independent of receiving a query and providing the corresponding query answer. If the computer loading low enough, an updated query answer can be obtained and used to replace the stored query answer.

In various embodiments, the storage time for a query answer can be dependent on whether an updated query answer is potentially available. For example, due to the large number of Internet documents, it can take hours to search all available documents. As a result, documents on the Internet are typically pre-searched to identify keyword matches and other searchable features of the documents. The pre-search results are stored in an index, such as an inverted index. When a search query is received, this pre-search index is used to form the query answer. Once a query answer is formed, the query answer will contain the most current possible information until the next time the pre-search index is updated. In an embodiment, the pre-search index is only updated once every 24 hours. In such an embodiment, the storage time for a query answer can be measured based on when the pre-search index is updated rather than the total length of time the query answer has been stored in the cache.

VIII. Multi-Level Caching

In another embodiment, more than one level of caching can be used for storing query answers. In addition to the main cache associated with the inverted index of documents, one or more secondary or local caches can be used to store and serve query answers. The secondary computers and secondary cache can be helpful when a geographic or logical region has a longer latency period for providing a response to a search query. Having a local cache should improve the response time for query answers stored in the local cache. For example, if the primary computers, primary cache, and inverted index are located in the United States, one or more computers could be set up as secondary computers and a secondary cache for storing and providing query answers for queries received from users in Japan.

When a query is received from a user in Japan, the secondary computers would consult the query answers stored in the secondary cache. If no matching query answer is stored in the secondary cache, the query would be forwarded to the primary computers for processing as described above. If a stored query answer is available, the query storage time for the query answer can be used to determine whether the query answer should be provided, or whether the query should be forwarded to the primary computers for processing. The primary computers would then determine if a query answer stored in the primary cache should be provided, or if instead an updated query answer should be obtained based on the query. In either case, a query answer is provided from the primary computers back to the secondary computers. In evaluating the query storage time for a query answer in the secondary cache, an independent set of thresholds $T_0$, $T_1$, $T_2$, and $T_3$ can be used. Alternatively, the secondary computers could use any other convenient scheme for determining whether to serve a stored query result versus obtaining a new result from the primary computers. Note that because the secondary computers receive queries from only a limited area, fewer query answers will need to be stored. This would allow the secondary cache to have a smaller size.

In still another embodiment, a plurality of secondary computers and corresponding secondary caches can be used to store and provide query results for various smaller geographic or logical areas. In yet another embodiment, multiple levels of computers and caches may be used. For example, if a secondary cache is used to store and provide query results for queries from users in Japan, a tertiary cache could be used to store and provide query results for queries from a single city in Japan.

IX. Exemplary Embodiment—Storing and Providing Query Answers for Search Queries on Large Document Collections In an embodiment of the invention, a query corresponds to a search query for documents from a large document collection, such as the Internet. In such an embodiment, a query answer can correspond to a listing of one or more documents that match the search query. The query answer can be composed of just the documents, the documents in a particular order, or the documents along with additional feature values used by a search engine to determine whether the documents matched the search query.

Figure 3:
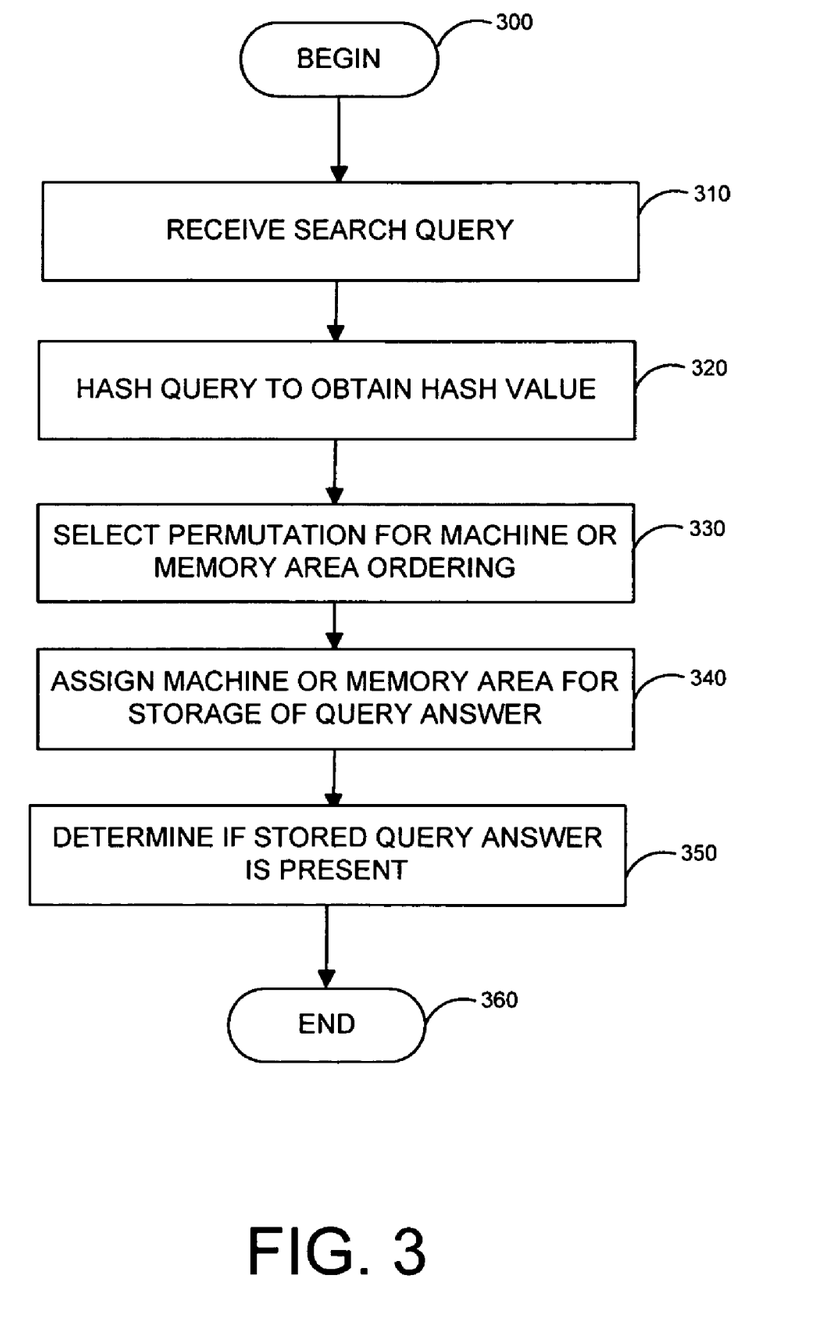
FIG. 3 is a flow chart illustrating a method for selecting a machine or memory device for storage and/or retrieval of a stored query answer.

In an embodiment corresponding to FIG. 3, a search query is received 310 by a search engine. The search query can be a search query provided by a user, a search query formed by an automated search algorithm, or a search query from another source. After receiving 310 the search query, the machine or memory device containing a stored query answer corresponding to the query is identified. This can be accomplished by hashing 320 the query to obtain a hash value. This hash value is used to select 330 a permutation of how to order the members in a permutation array. The first machine found in the selected permutation is assigned 340 as the primary storage area. In another embodiment, backup storage machines can also be assigned 340 at this point. After identifying the machine that should hold a query answer, the presence of a stored query answer corresponding to the query is determined 350.

Figure 4:
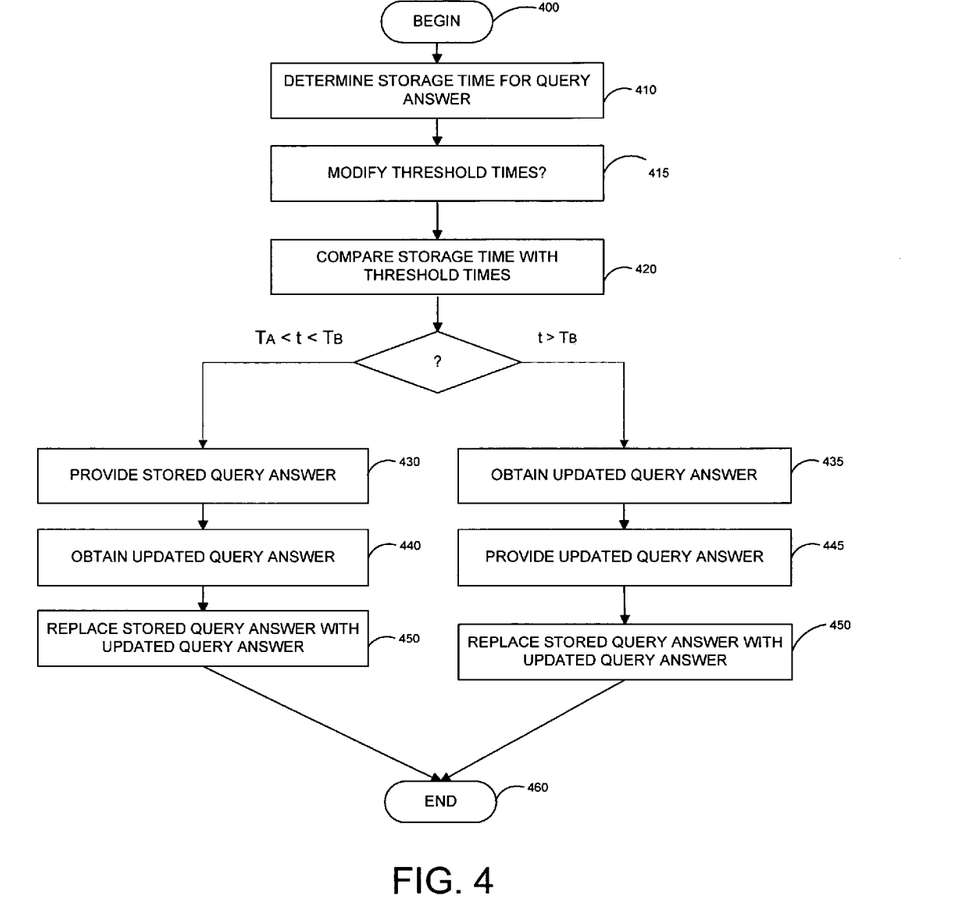
FIG. 4 is a flow chart illustrating a method for providing a query answer for a query.

If a stored query answer is present, the stored query answer can be evaluated according to an embodiment of the invention as shown in FIG. 4. In FIG. 4, the storage time for the stored query answer is determined 410. In this embodiment, the query is a request for matching documents from a large document collection. The large document collection is not searched directly using the query, but instead the query is used to search a pre-search index of the document collection. In this embodiment, the storage time for the stored query answer is evaluated relative to the last time the pre-search index was updated.

After determining the storage time 410 for the stored query answer, the storage time is compared 420 with available storage thresholds. If the storage time "t" is greater than a first threshold $T_A$ but less than a second threshold $T_B$, the stored query answer is provided 430 in response to the query. An updated query answer 440 is then obtained and used to replace 450 the stored query answer. Alternatively, if the storage time is greater than the second threshold, the stored query answer is not used. Instead, the query is used to obtain 435 an updated query answer and the updated query answer is provided 445 in response to the query. Note that in the embodiment shown in FIG. 4, the second threshold $T_B$ may vary in time. The modification 415 of the second threshold occurs before the storage time for the stored query answer is compared with the thresholds.

IX. Additional Examples

Other types of query answers can be stored and provided using the methods of this invention. In an embodiment, a query can correspond to a request for data using "optimistic locking." Optimistic locking refers to a situation where data is provided based on a request, but the data is not guaranteed to remain true. For example, a user of an e-commerce web site can submit a query asking for available products, such as books about sports. A corresponding query answer for this query could provide a list of all books about sports available on the e-commerce web site, a link to a description of each book, and/or a number of available copies for each book. In this situation, a stored query answer could be provided in response to the query without verifying the number of available copies. If a user then submitted a follow-up query showing interest in buying a specific book, the number of available copies could be verified for the specified book. This same model might also be used for other types of e-commerce requests, such as requests for available seats on airplanes or requests for available seats at a concert performance.

Having now fully described this invention, it will be appreciated by those skilled in the art that the invention can be performed within a wide range of parameters within what is claimed, without departing from the spirit and scope of the invention.

What is claimed is:

1. A method for providing a query answer in response to a query, comprising:
    receiving a query corresponding to a stored query answer;
    calculating a hash value based on the query using the formula $H=f(R[g(H,S[i])$ modulo $2^L], H, S[i])$, where H represents the hash value, R[ ] is an array or table of randomized values, S[ ] is a query string corresponding to the query, L is an integer corresponding to a number of bits, and f and g are functions;
    selecting a permutation based on the hash value, the permutation containing an ordering for a plurality of members corresponding to memory devices, wherein the ordering comprises a list that includes a first memory device configured to store the stored query answer and a second memory device configured to store a backup copy of the stored query answer;
    identifying a memory device having the stored query answer based on the ordering of the plurality of members in the permutation; and
    providing the stored query answer in response to the query.

2. The method of claim 1, wherein identifying a memory device having the stored query answer comprises identifying the first memory device in the permutation.

3. The method of claim 1, wherein identifying a memory device having the stored query answer comprises identifying a plurality of memory devices based on the ordering of memory devices in the permutation.

4. The method of claim 1, wherein the hash value comprises one or more partial or incremental hash values.

5. The method of claim 1, wherein calculating the hash value comprises computing a value based on two or more values selected from the group consisting of values corresponding to characters in the query, values from a table of randomized values, and values corresponding to bits from a previous hash value.

6. The method of claim 1, wherein the permutation further comprises a plurality of members that do not correspond to a memory device.

7. The method of claim 1, wherein the method further comprises, prior to providing the stored query value, determining a storage time for the stored query answer, wherein the storage time is greater than a refresh time and less than a discard time.

8. The method of claim 7, further comprising:
obtaining an updated query answer; and
replacing the stored query answer with the updated query answer.

9. The method of claim 1, wherein the query comprises keyword search query for a large document collection.

10. A method for providing a query answer in response to a query, the method comprising:
receiving a query corresponding to a stored query answer;
determining a storage time for the stored query answer, the storage time being greater than a threshold time value;
calculating a hash value based on the query using the formula $H=f(R[g(H,S[i])\ \text{modulo}\ 2^L], H, S[i])$, where H represents the hash value, R[ ] is an array or table of randomized values, S[ ] is a query string corresponding to the query, L is an integer corresponding to a number of bits, and f and p are functions:
determining a permutation based on the hash value associated with the stored query answer, the permutation containing an ordering for a plurality of members corresponding to memory devices, wherein the ordering comprises a list that includes a first memory device configured to store the stored query answer and a second memory device configured to store a backup copy of the stored query answer;
providing the stored query answer in response to the query; and
obtaining an updated query answer based on the query and replacing the stored query answer with the updated query answer.

11. The method of claim 10, wherein the threshold time value is a refresh time.

12. The method of claim 11, wherein the storage time is less than a discard time.

13. The method of claim 10, further comprising identifying a memory device having the stored query answer.

14. The method of claim 10, wherein receiving a query corresponding to a stored query answer comprises receiving a query at a secondary computer, and wherein obtaining an updated query answer comprises forwarding the query to a primary computer and obtaining a query answer provided by the primary computer.

15. A method for providing a query answer in response to a query, comprising:
storing the query answer corresponding to the query on a first memory device, the query corresponding to a hash value, wherein the first memory device is a member of a group of available memory devices;
calculating the hash value based on the query using the formula $H=f(R[g(H,S[i])\ \text{modulo}\ 2^L], H, S[i])$, where H represents the hash value, R[ ]is an array or table of randomized values, S[ ] is a query string corresponding to the query, L is an integer corresponding to a number of bits, and f and g are functions;
storing a backup copy of the query answer on a second memory device, wherein the second memory device is a member of the group of available memory devices;
removing the first memory device from the group of available memory devices;
determining a permutation based on the hash value, wherein the permutation indicates a sequential ordering of the memory devices in the group, wherein the first memory device and the second memory devices are respectively listed as the first and second devices in the sequential ordering;
receiving the query corresponding to the stored query answer;
calculating the hash value based on the received query;
identifying the second memory device as storing the first query answer based on the hash value; and
providing the stored query answer in response to the query.

16. The method of claim 15, further comprising:
storing a second query answer corresponding to a second query on the first memory device and a third memory device prior to removal of the first memory device, the second query corresponding to a second hash value, wherein the third memory device is a member of the group of available memory devices;
receiving the second query corresponding to the stored second query answer;
calculating the second hash value corresponding to the second received query;
identifying the third memory device as storing the second query answer based on the second hash value; and
providing the stored second query answer in response to the second query.

* * * * *